Patented Sept. 14, 1937

2,093,113

UNITED STATES PATENT OFFICE 2,093,113

AMINO-CHRYSENE-SULPHONIC ACIDS AND A PROCESS OF PREPARING THEM

Werner Schultheis, Frankfort-on-the-Main, Germany, assignor to General Aniline Works, Inc., New York, N. Y., a corporation of Delaware No Drawing. Application December 6, 1934, Serial No. 756,365. In Germany December 15, 1933

7 Claims. (Cl. 260—129)

The present invention reates to amino-chrysene-sulphonic acids and a process of preparing them.

Amino-chrysene-sulphonic acids have hitherto not been known. Now, I have found that amino-chrysene-sulphonic acids are obtainable by one of the following methods, for instance, by causing a sulphonating agent as, for instance, strong sulphuric acid to react with an amino-chrysene at room-temperature or a temperature up to about 220° C., advantageously at a temperature between 20° C. and 50° C. After sulphonation, the whole is advantageously diluted with water and the sodium salt formed is separated.

By treating a nitrochrysene with a sulphonating agent such as, for instance sulphuric acid of 99% or chlorosulphonic acid, and reducing subsequently the nitrosulphonic acids formed, the corresponding amino-chrysene-sulphonic acid is obtained.

By heating the acid sulphate of an aminochrysene to higher temperatures, i. e. to about 200° C.–about 220° C., advantageously under reduced pressure, and extracting the reaction products with water, the corresponding aminochrysene-sulphonic acid is obtained.

A further method for the preparation of amino-chrysene-sulphonic acids consists in starting from sulphamino-chrysenes which are obtainable by the action of chlorosulphonic acid on aminochrysene in pyridine and heating the sulphaminochrysenes obtained, advantageously in a high-boiling solvent, whereby transposition of the sulphonic group takes place.

The amino-chrysene-sulphonic acids thus obtained are valuable intermediates for the preparation of dyestuffs.

The following examples serve to illustrate the invention, but they are not intended to limit it thereto; the parts are by weight:

1. 20 parts of 2-amino-chrysene melting at 206° C. are added, while stirring, to 200 parts of sulphuric acid monohydrate at ordinary temperature, whereby the temperature rises to about 40° C.–45° C. After stirring for 1 hour the whole is poured on ice and filtered with suction. The product is dissolved in sodium carbonate, filtered and the sodium salt of amino-chrysene-sulphonic acid is precipitated by means of sodium chloride solution. The product recrystallizes from water in the form of colorless leaflets. By diazotizing the amino-chrysene-sulphonic acid thus formed, a red-brown diazo solution is obtained. On addition of alkaline beta-naphthol solution it yields a red-violet dyestuff. By deamidizing the amino-chrysene-sulphonic acid and fusing with alkali the chrysene-sulphonic acid thus formed, hydroxy-chrysene melting at 279° C. to 280° C., is obtained which is not identical with 2-hydroxy-chrysene. Diazotized sulphanilic acid yields on addition of an alkaline solution of the hydroxy-chrysene of melting point 279–280° C. a blue dyestuff which turns red-brown when acidified.

2. 20 parts of 2-nitro-chrysene melting at 210° C. are introduced into 200 parts of sulphuric acid of 99% at room temperature and the whole is stirred for 1 hour at 50° C. The whole is then poured on ice and the nitro-chrysene-sulphonic acid is salted out. It respresents a feebly yellow product. The sulphuric acid solution of nitro-chrysene-sulphonic acid is reduced on the steam bath by means of iron until the yellow color has disappeared. The amino-chrysene-sulphonic acid which has separated is filtered with suction and dissolved in sodium carbonate, filtered from the iron and salted out in the form of the sodium salt. By diazotizing the amino-chrysene-sulphonic acid thus obtained and coupling it with beta-naphthol in alkaline solution a violet dyestuff is obtained.

3. 50.6 parts of 2-amino-chrysene melting at 206° C. are kneaded with 80 parts of sulphuric acid of 99%. The amino-chrysene-sulphate thus obtained is heated at about 200° C. to 220° C. under reduced pressure of 20–30 mm. Hg. for 6 to 8 hours, or heated to boiling for 2 to 3 hours at ordinary pressure in the presence of 500 parts of chloronaphthalene. The amino-chrysene-sulphonic acid formed is dissolved by means of sodium carbonate and precipitated in the form of its sodium salt. It is probably a 2-amino-chrysene-8-sulphonic acid and is not identical with the product obtainable according to Example 1. By deamidizing the chrysene-sulphonic acid thus formed 2-chrysene-sulphonic acid is obtained which yields, when fused with alkali, 2-hydroxy-chrysene melting at 246° C.

4. 20 parts of sulphamino-chrysene obtainable, for instance, by the action of chloro-sulphonic acid on 2-amino-chrysene melting at 206° C., in anhydrous pyridine at 80° C. to 90° C., are heated to boiling for 2 hours in 300 parts of chloronaphthalene. The product is cooled and filtered with suction, the adherent chloro-naphthalene is removed by means of steam, the amino-chrysene-sulphonic acid is dissolved in dilute sodium carbonate solution, the solution is filtered from the undissolved matter and the amino-chrysene-sulphonic acid is salted out by means of sodium chloride solution. This acid is probably identical with that obtained according to Example 3.

5. 20 parts of 2,8-diamino-chrysene melting at 284° C., obtainable by reduction of dinitro-chrysene, are stirred in 300 parts of sulphuric acid monohydrate for 3 to 4 hours at 45° C. to 50° C. The whole is poured on ice, filtered with suction, dissolved in sodium carbonate and filtered. The diamino-chrysene-sulphonic acid is precipitated by means of sodium chloride. The diamino-chrysene sulphonic acid thus obtained crystallizes from water in the form of feebly yellow leaflets. By diazotizing this diamino-chrysene-sulphonic acid and by introducing it into alkaline-naphthol solution a blue violet dyestuff is obtained.

6. 20 parts of 2-acetamino-chrysene melting at 286° C. to 288° C. are introduced, while stirring, into 200 parts of sulphuric acid monohydrate at room temperature. Thereby, the temperature rises to 40° C. to 45° C. The whole is stirred for 1 hour, poured into water, heated to boiling and filtered. The sodium salt of amino-chrysene-sulphonic acid is precipitated by means of sodium chloride solution. The whole is filtered with suction, the solid matter is washed with sodium chloride solution until neutral and dried. The amino-chrysene-sulphonic acid is probably identical with that obtained according to Example 1. Instead of 2-acetamino-chrysene there may also be used 2-benzoylaminochrysene melting at 250° C. to 251° C.

7. 20 parts of amino-acetamino-chrysene melting at 266° C. to 268° C. are introduced, while stirring, into 300 parts of sulphuric acid monohydrate at 45° C. to 50° C. for 3 to 4 hours. The whole is poured on ice, filtered with suction, dissolved in sodium carbonate and filtered. The diamino-chrysene-sulphonic acid is precipitated by means of sodium chloride. It is probably identical with that obtained according to Example 5.

The amino-acetamino-chrysene used as starting material may be prepared as follows:

Acetaminochrysene, melting at 286° C. to 288° C., is suspended in glacial acetic acid and nitrated at about 70° C. to about 80° C. with nitric acid of specific gravity 1.5. The nitro product obtained is reduced in pyridine by means of hydrogen and in the presence of finely divided nickel in an autoclave at 70° C. to 90° C. The amino-acetamino-chrysene obtained may be recrystallized from glacial acetic acid.

I claim:

1. The process which comprises treating with a sulphonating agent at temperatures between room temperature and about 220° C. a chrysene which contains in its 2-position a substituent of the group consisting of $NO_2$ and $NH_2$.

2. The process which comprises kneading 2-amino-chrysene with sulphuric acid of 96% and heating at about 200° C. to about 220° C. for 6 to 8 hours the amino-chrysene sulphate thus obtained at an atmospheric pressure of 20 to 30 mm. Hg.

3. The process which comprises stirring a mixture of 2-amino-chrysene and sulphuric acid-monohydrate for about one hour.

4. A mono-sulphonic acid of chrysene having a substituent of the group consisting of amino and nitro groups in the 2-position.

5. The compound of the formula

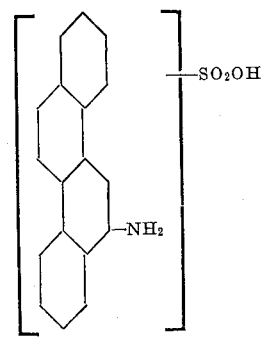

and the salts thereof which on deamidation and fusion with alkali of the chrysene sulphonic acid formed yields hydroxy-chrysene which melts at 279° C. to 280° C. and is not identical with 2-hydroxy-chrysene.

6. The compound of the formula

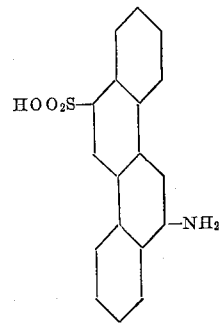

and the salts thereof which on deamidation and fusion with alkali of the 2-chrysene-sulphonic acid formed yields 2-hydroxy-chrysene melting at 246° C.

7. The compound of the formula

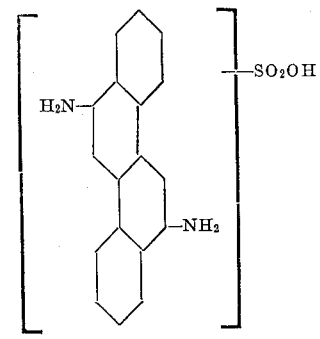

and the salts thereof which crystallizes from water in the form of feebly yellow leaflets and on diazotization and introduction into alkaline naphthol solution yields a blue violet dyestuff.

WERNER SCHULTHEIS.